INVENTORS
ANTHONY ERIC RAOUL KEACH
MICHAEL CHARLES SMITH
BY Kinchston, Kinchston & Ottinger
ATTORNEYS INVENTORS
Anthony Eric Raoul Keach
Michael Charles Smith
BY
Kurtzheim, Kurtzheim & Ottinger
ATTORNEYS United States Patent Office 3,441,920
Patented Apr. 29, 1969

3,441,920
MULTI-CORE PER BIT STORAGE ARRAY

Anthony Eric Raoul Keach, Coventry, and Michael Charles Smith, Rugby, England, assignors to The General Electric Company Limited, London, England, a British company Filed May 23, 1966, Ser. No. 552,164
Claims priority, application Great Britain, May 21, 1965, 21,719/65
Int. Cl. G11b 5/44
U.S. Cl. 340—174 17 Claims This invention relates to magnetic data store devices.

It has been proposed in the complete specification of co-pending British patent application No. 49,668/64 to provide a magnetic data store device comprising a member which is of toroidal or other form such that it embraces an aperture and which is fabricated of ferromagnetic material having a generally rectangular hysteresis characteristic so as to obtain two stable magnetic states for that member, a relatively large member which is of toroidal or other form such that it embraces a relatively large aperture and which is fabricated of ferromagnetic material having a hysteresis characteristic that is substantially linear for at least a predetermined range of values of applied magnetic filed, a continuous electric conductor path which passes through both apertures, a plurality of conductors which pass through said large aperture and one or more further conductors which pass through the relatively small aperture, the arrangement being such that all said conductors are inductively coupled to the relatively small member so that the state of the member can be changed selectively by supplying electric current to one or more of these conductors and so that output pulses are induced in a further one or more of these conductors by such changes.

It also has been proposed in the aforementioned specification to provide a magnetic data storage arrangement which employs a plurality of magnetic data store devices that are each in accordance with the preceding paragraph.

The two stable magnetic states of a member which is fabricated of ferromagnetic material having a generally rectangular hysteresis characteristic result from the large retentivity of such material.

The "retentivity" of a material is the magnetic flux density remaining in the material after removal of a magnetising force that has produced magnetic saturation of either polarity in the material.

Ferromagnetic material of which the permeability is high and the retentivity is small has a hysteresis characteristic that is substantially linear for at least a predetermined range of values of applied magnetic filed.

When a conductor which passes through said relatively small aperture is supplied with an electric current of suitable sense but of insufficient magnitude to change the state of said relatively small member, a voltage disturbance is induced in the conductor or each conductor, if more than one, which passes through said large aperture. The occurrence of such a voltage disturbance may be confused with an occurrence of a genuine voltage output signal resulting from a change in the state of said relatively small member. Clearly this is an undesirable state of affairs.

It is an object of the present invention to provide an improved and modified form of the magnetic data store device referred to above in which the occurrence of a voltage disturbance in the circumstances described is substantially prevented.

According to the present invention, a magnetic data store device is provided with first and second members which each is of toroidal or other form such that it embraces an aperture and which each is fabricated of ferromagnetic material having a generally rectangular hysteresis characteristic, a further member which is of toridal or other form such that it embraces an aperture and which is fabricated of high permeability ferromagnetic material having a small retentivity, a continuous electric conductor path which passes through all three apertures, an output conductor which passes through the aperture of said further member, a control conductor which passes through the aperture of said second member and a further control conductor which passes through the apertures of said first and second members, the arrangement being such that, during operation, when an electric current is supplied to said further control conductor only, the resulting changes in flux in the first and second members cause generally equal and opposite voltages to be induced in said conductor path so that substantially no output signal is induced in said output conductor, and when suitable electric currents are supplied to both control conductors an output signal is obtained in said output conductor.

According to a feature of the present invention, a magnetic data store device comprises first, second and third members which each is of toroidal or other form such that it embraces an aperture and which each is fabricated of ferromagnetic material having a generally rectangular hysteresis characteristic, a further member which is of toroidal or other form such that it embraces an aperture and which is fabricated of high permebility ferromagnetic material having a small retentivity, a continuous electric conductor path which passes through all four apertures, an output conductor which passes through the aperture of said further member and two control conductors which pass through the apertures of said first and second members and said second and third members respectively, the arrangement being such that, during operation, when an electric current is supplied to either one of said control conductors, the resulting changes in flux in two of the first, second and third members cause generally equal and opposite voltages to be induced in said conductor path so that substantially no output signal is induced in said output conductor, and when suitable electric currents are supplied to both control conductors an output signal is obtained in said output conductor.

A magnetic data storage arrangement may employ a plurality of magnetic data store devices that each is in accordance with the last paragraph.

Such a magnetic data storage arrangement may have the magnetic data store devices arranged in a matrix comprising M columns and N rows of these devices where M and N are integers. The magnetic data store devices of any colmun each may have on of its control conductors included in a control path that is individual to that column and the magnetic data store devices of any row each may have the other one of its control conductors included in a control path that is individual to that row.

The said output conductor of each magnetic data store device may comprise any one of a plurality of conductors that all pass through the same aperture of that device.

A magnetic data store device in accordance with the present invention may comprise four members which each is of toroidal or other form such that it embraces an aperture and which each is fabricated of ferromagnetic material having a generally rectangular hysteresis characteristic, a further member which is of torodial or other form such that it embraces an aperture and which is fabricated of high permeability ferromagnetic material having a small retentivity, a continuous electric conductor path which passes through all five apertures, an output conductor which passes through the aperture of said further member and three control conductors which pass through the aperture of a predetermined one of said four members and also through the apertures of the other three of those members respectively, the arrangement being such that, during operation, when an electric current is supplied to any one of said control conductors, the resulting change in flux in two of said four members cause generally equal and opposite voltages to be induced in said conductor path so that substantially no output signal is induced in said output conductor, and when suitable electric currents are supplied to all of the control conductors an output signal is obtained in said output conductor.

A magnetic data storage arrangement may employ a plurality of magnetic data store devices that each is in accordance with the last paragraph.

Such a magnetic data storage arrangement may have the magnetic data store devices arranged in a three co-ordinate array having rows of these devices in each co-ordinate, and the magnetic data store devices of any row in one co-ordinate each may have one of its control conductors included in a control path that is individual to that row, the magnetic data store devices of any row in a second co-ordinate each may have a second one of its control conductors included in a control path that is individual to that row and the magnetic data store devices of any row in the third co-ordinate each may have the third one of its control conductors included in a control path that is individual to that row.

A magnetic data store device in accordance with the present invention may be modified by substituting a body of ferromagnetic material having a generally rectangular hysteresis characteristic transfluxor for the plurality of members of rectangular hysteresis characteristic, the said body embracing a number of apertures equal to the number of members which it replaces.

One embodiment of a magnetic data storage arrangement in accordance with the present invention will now be described by way of example, with reference to the three figures of the accompanying drawings in which.

Figure 1:
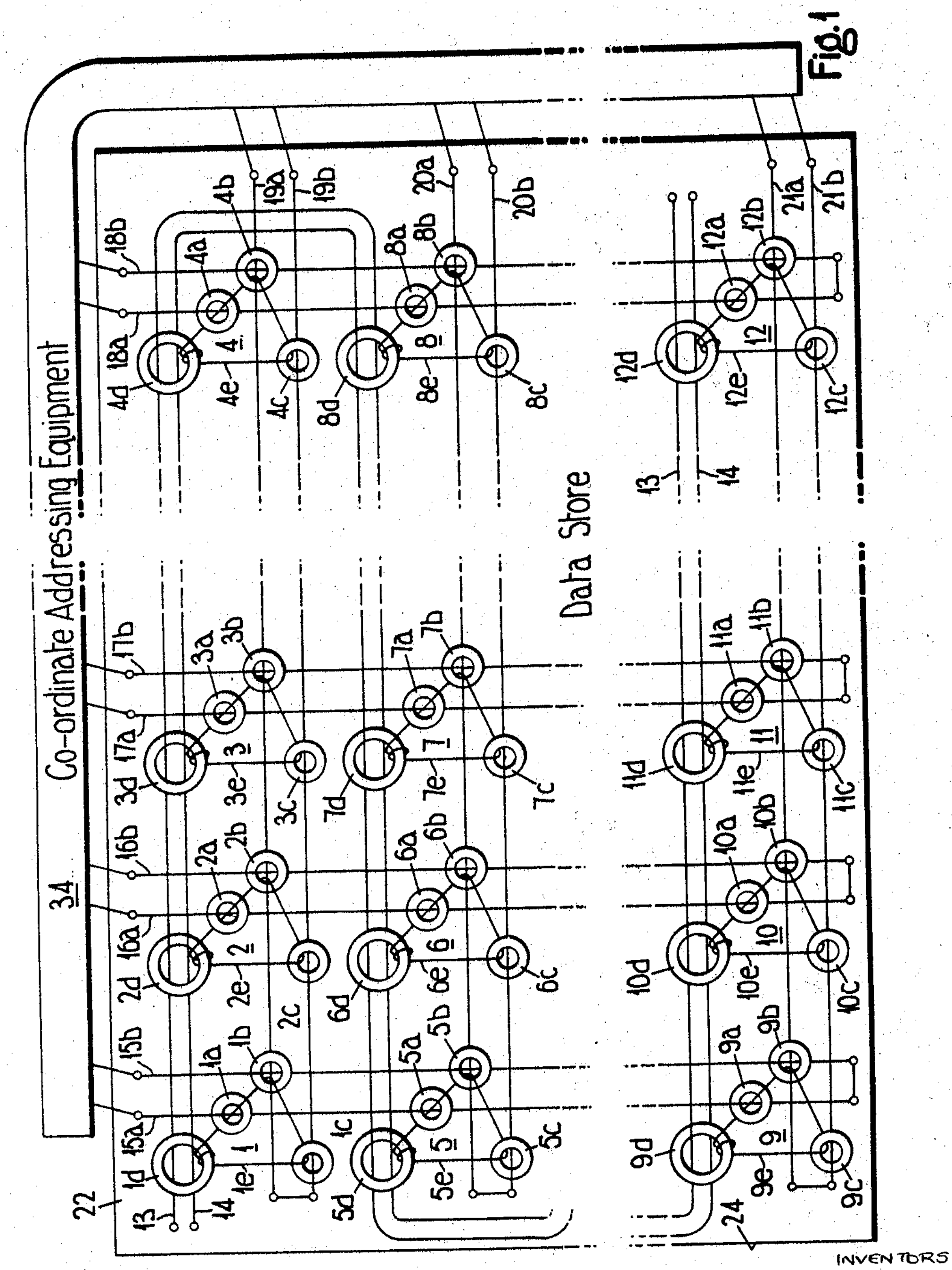
FIGURE 1 shows the data storage arrangement diagrammatically.

Referring to FIGURE 1, the data storage arrangement to be described provides semi-permanent storage of two-hundred and twenty-five binary words which each comprises eighteen binary digits, and employs an individual magnetic data store device for each word stored. Only the magnetic store devices 1 to 12 are depicted. Eighteen conductors which are hereinafter referred to as the "output" conductors and of which only the output conductors 13 and 14 are shown, are selectively coupled to each data store device 1 to 12 so as to determine the values of the eighteen binary digits respectively of the binary word stored by that device. A further thirty conductors, which are hereinafter referred to as the "control" conductors and of which only the control conductors 15 to 21 are shown, are coupled to the data store devices 1 to 12 so as to facilitate the selective reading out of the binary words stored by those devices.

Each store device, for example, the store device 1, has four toroidal core members 1*a*, 1*b*, 1*c* and 1*d*. The core members 1*a*, 1*b* and 1*c* are identical and are fabricated of ferromagnetic material having a generally rectangular hysteresis characteristic and hence a large retentivity, for example, the material sold by the Plessey Company Limited under the designation "S7." These core members 1*a*, 1*b* and 1*c* have external and internal diameters respectively of 0.1 inch and 0.055 inch and subsubsequently are referred to individually as the "first," "second" and "third" cores. The fourth core member 1*d* is fabricated of high permeability ferromagnetic material of which the hysteresis characteristics is substantially linear for at least a predetermined range of values of applied magnetic field, this material having a small retentivity. A suitable material is that sold under the trade named "Feralex-P" by Salford Electrical Instruments Limited. This core member 1*d* has external and internal diameters respectively of 0.75 inch and 0.25 inch. All four core members 1*a*, 1*b*, 1*c* and 1*d* are linked by a continous conductor path 1*e* of copper wire which passes once through the aperture of each of the first, second and third cores 1*a*, 1*b* and 1*c* and twice through the aperture in the fourth core memebr 1*d* so as to form one turn on each of the first, second and third cores and two turns of the fourth core member.

The store devices 1 to 12 are mounted on a board 22 of electrical insulating material and are arranged in a matrix comprising fifteen columns and fifteen rows of these devices. Fifteen of the control conductors such as the control conductors 15 to 18 are associated with the fifteen columns respectively of the data store devices. Each of these control conductors, for example, the control conductor 15, comprises two wires 15*a* and 15*b* which physically are in parallel and which electrically are in series. The wires 15*a* and 15*b* are covered with electrical insulating material such as shellac and respectively pass through the apertures of the first cores 1*a*, 5*a*, 9*a* and the second cores 1*b*, 5*b*, 9*b* of every data store device 1, 5, 9 in the associated column. The other fifteen control conductors, such as the control conductors 19, 20 and 21, are associated with the fifteen rows respectively of the data store devices. Each of these control conductors, for example, the control conductor 19, comprises two wires 19*a* and 19*b* which physically are in parallel and which electrically are in series. The wires 19*a* and 19*b* are covered with electrical insulating material such as shellac and respectively pass through the aperture of the second cores 1*b*, 2*b*, 3*b*, 4*b* and the third cores 1*c*, 2*c*, 3*c*, 4*c*, of every data store device 1, 2, 3, 4 in the associated row. Thus each of the data store devices 1 to 12 is coupled inductively to a different combination of one column control conductor 15, 16, 17, 18 and one row control conductor 19, 20, 21.

For each data store device, such as the store device 1, the associated column control conductor passes through the apertures in the first and second cores 1*a* and 1*b* of that device in opposite senses so that an electric current supplied to that conductor induces opposing voltages in the conductor path 1*e* through these cores. Similarly the associated row control conductor 19 passes through the apertures in the second and third cores 1*b* and 1*c* of that device 1 in opposite senses so that an electric current supplied to that conductor induces opposing voltages in the associated conductor path 1*e*. Because the first, second and third cores 1*a*, 1*b* and 1*c* are identical such opposing inducted voltages are generally equal in amplitude.

The output conductors such as the output conductors 13 and 14 extend to and fro across the broad 22 and pass along a different row of the store devices 1 to 12 on each traverse of that board. The eighteen output conductors are covered with electrical insulating material such as shellac and corresponding respectively to the eighteen digit positions in the binary words stored by the data store devices 1 to 12. With each store device, for example, the stored evice 1, the output conductor, such as the output conductor 14, corresponding to any digit position at which the binary digit "1" is stored passes through the aperture in the fourth core member 1*d* of that device 1 and the output conductor, such as the output conductor 13, corresponding to any digit position at which the binary digit "0" is stored by-passes that device.

Each continuous conductor path, such as the conductor path 1*e* of the data store device 1, is arranged so as to provide a high degree of inductive coupling between the fourth core member 1*d* and each of the first, second and third cores 1*a*, 1*b* and 1*c* of that device. Consequently the output conductors 13, 14 that pass through the aperture in the fourth core member 1*d* to 12*d* of any data store device 1 to 12 are coupled inductively to the second core 1*b* to 12*b* of that device.

Figure 2:
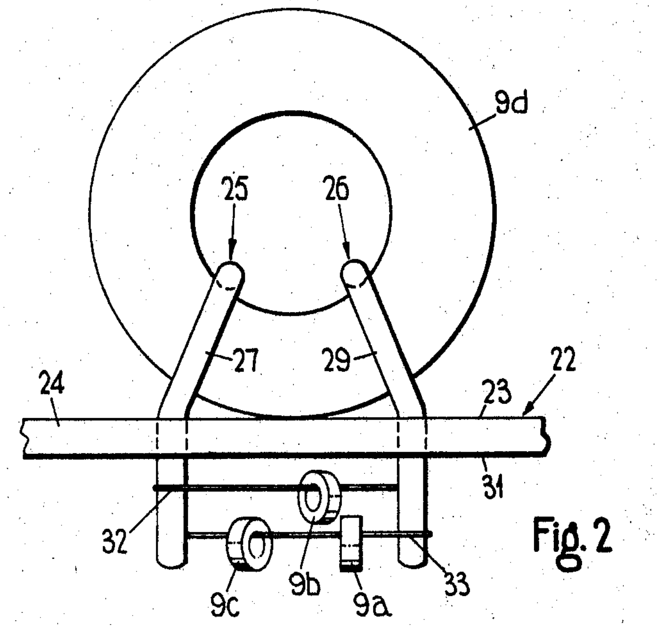
FIGURE 2 shows, to a larger scale, a side elevation of a magnetic data store device that is employed in the storage arrangement of FIGURE 1.
Figure 3:
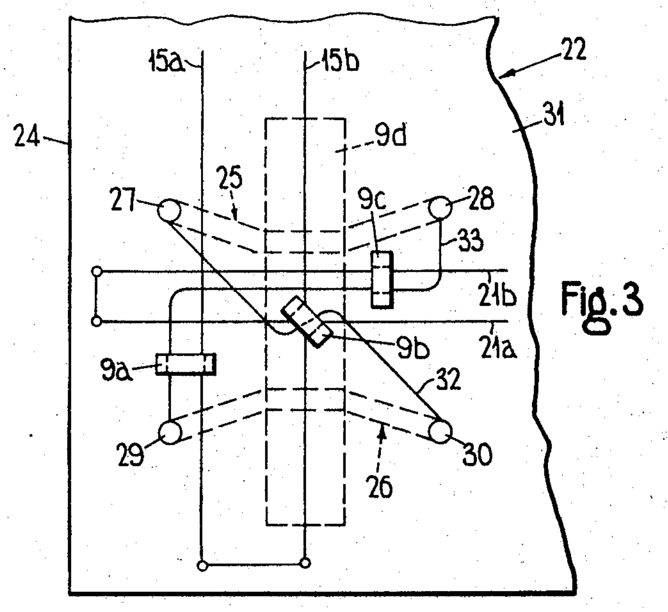
FIGURE 3 shows an underneath view of the magnetic data store device of FIGURE 2.

The manner in which each magnetic data store device is mounted on the board 22 is illustrated in respect of the data store device 9 in FIGURES 2 and 3 to which reference now also should be made.

The fourth core member 9*d* of the data store device 9 is mounted on edge on the upper surface 23 of the board 22 with its aperture facing the edge 24 of that board. Such mounting is effected by means of two staples 25 and 26 of heavy gauge copper wire that are included in the continuous conductor path 9*e* for the store device 9. Each staple 25, 26 passes through the aperture of the core member 9*d* and its limbs 27 and 28, 29 and 30 extend through and are a tight fit in apertures through the board 22.

The free ends of the limbs 27 to 30 that project from the undersurface 31 of the board 22 serve as terminals for the connection of two insulation covered copper wires 32 and 33 which complete the continuous conductor path 9*e*. The wire 32 is connected between the limb 27 of the staple 25 and the limb 30 of the staple 26 and is threaded through the aperture of the second core 9*b* of the data store device 9. The wire 33 is connected between the limb 28 of the staple 25 and the limb 29 of the staple 26 and is threaded through the aperture of the first and third cores 9*a* and 9*c* of the data store device 9. The core 9*a* is supported by the wires 15*a* and 33, the core 9*b* by the wires 15*b*, 21*a* and 32, and the core 9*c* by the wires 21*b* and 33.

It will be appreciated from FIGURES 2 and 3 that the control conductors 15 to 21 are on one side of the board 22 while the output conductors 13, 14 are on the opposite side of that board.

During operation each of the first cores 1*a* to 12*a*, each of the second cores 1*b* to 12*b* and each of the third cores 1*c* to 12*c* normally is conditioned to a predetermined one of the two stable magnetic states which result from the rectangular hysteresis characteristic of that core and which correspond to the two distinct values of remanent magnetic flux that can be obtained in that core.

When it is required to read out the binary word stored by any one of the data store devices, for example, the store device 1, generally coincident electric current pulses are supplied by co-ordinate addressing equipment 34 to the two control conductors 15 and 19 which are associated respectively with the column and row of the said matrix that have this device at their intersection. Each of these current pulses has the sense necessary to change any of the core members 1*a*, 1*b*, 5*a*, 5*b*, 9*a*, 9*b* or 1*b*, 1*c*, 2*b*, 2*c*, 3*b*, 3*c*, 4*b*, 4*c* that it traverses from the said predetermined one of its two stable states to the other but has only slightly more than half the magnitude required to effect that change. In each data store device 2, 3, 4, 5 and 9 which is supplied with one only of the current pulses, generally equal and opposite voltages are induced in the continuous conductor path 2*c*, 3*c*, 4*c*, 5*c*, 9*c* through the second core 2*b*, 3*b*, 4*b*, 5*b*, 9*b* and one of the first and third cores 2*c*, 3*c*, 4*c*, 5*a*, 9*a*. These voltages cancel and substantially no voltage disturbance occurs in any of the output conductors 13, 14 which pass through the aperture in the fourth core member 2*d*, 3*d*, 4*d*, 5*d* or 9*d* of the data store device 2, 3, 4, 5 or 9.

In the data store device 1 which is storing the binary word that is to be read out the second core 1*b* is energised in the same sense by each of the said current pulses. The respective magnitudes of these current pulses are such that together they effect the said change in the state of this second core 1*b*. Consequently a large change of magnetic flux occurs in this second core 1*b* relative to magnetic flux changes produced in the first and third cores 1*a* and 1*c* by the two current pulses respectively. An appreciable portion of this large flux change is reflected into the fourth core member 1*d* of this data store device 1 and thus results in a voltage pulse being induced in each of the output conductors, such as the output conductor 14, that passes through the aperture in this core member. No such pulse is induced in the other output conductors, such as the output conductor 13. The presence and absence of such voltage pulses on the output conductors 13, 14 characterise the binary word stored by this data store device 1.

Further current pulses having similar magnitudes and opposite senses to the original current pulses subsequently are supplied by the co-ordinate addressing equipment 34 to the same two control conductors 15 and 19 and restore the second core 1*b* of the data store device 1 to the said predetermined one of its two stable magnetic states. Those of the output conductors 13, 14 that previously had voltage pulses induced therein now have voltage pulses of the opposite polarity induced therein. Thus the binary word stored by this data store device 1 again is characterised on the output conductors 13, 14.

An alternative method of restoring the second core 1*b* to 12*b* of any one of the data store devices 1 to 12 to the said predetermined one of its two stable magnetic states involves the use of a further conductor (not shown). This conductor passes through the apertures in the first core 1*a* to 12*a*, the second cores 1*b* to 12*b* and the third cores 1*c* to 12*c* of the data store devices 1 to 12 and, during operation, is supplied with an electric current of sufficient magnitude and suitable polarity to change any of those cores to the said predetermined one of its two stable states from the other one of those states. Such an arrangement requires larger magnitudes for the current pulses which are supplied, during operation, to the control conductors 15 to 21 by the co-ordinate addressing equipment 34.

Although the operation of the magnetic data storage arrangement has been described in relation to the use of co-ordinate addressing equiment 34 which provides pulses on the control conductors 15 to 21 that each has slightly more than half the magnitude required to change the state of any of the core members 1*a* to 12*a*, 1*b* to 12*b*, 1*c* to 12*c* this is not the only mode of operation that is possible. Thus the binary word stored by any particular one of the store devices, for example, the store device 1, could be read out by arranging the co-ordinate addressing equipment to supply the two control conductors 15 and 19 associated with that device with current pulses each having at least the magnitude required to change the state of any of the first, second and third cores 1*a* to 12*a*, 1*b* to 12*b*, 1*c* to 12*c*. Such a pulse supplied to either one of these two control conductors 15 and 19, say the conductor 15, will change the state of every core member 1*a*, 1*b*, 5*a*, 5*b*, 9*a*, 9*b* that it traverses thereby causing generally equal and opposite voltages to be induced in the associated continuous conductor paths 1*e*, 5*c* and 9*e*. When such a current pulse then is supplied to the other control conductor 19 generally equal and opposite voltages similarly are induced in the conductor paths 2*e*, 3*e* and 4*e*. However, with the data store device 1 only the state of the third cores 1*c*, changes so that voltage pulses are induced in each of the output conductors, such as the output conductor 14, which pass through the aperture in the fourth core member 1*d*, of this data store device.

An advantage of this mode of operating the magnetic data storage arrangement is that the current pulses supplied to the two control conductors associated with any magnetic data store device do not have to be time coincident. Another advantage is that the magnitudes of these current pulses do not have to be closely tolerated to a specific value but have only to be at least sufficient to change the state of any of the first, second and third cores 1*a* to 12*a*, 1*b* to 12*b* and 1*c* to 12*c*.

We claim:

1. A magnetic data store device wherein there are provided first and second members which each is fabricated of ferromagnetic material having an approximately rectangular hysteresis characteristic and hence a large retentivity and which each has an aperture, a further member which is fabricated of high permeability ferromagnetic material having a small retentivity and which has an aperture, a continuous electric conductor path which passes through all three apertures and in which electric signals are induced by and induce magnetic flux changes respectively in said first and second members and in said path, and a second control conductor which passes through the aperture of said further member and in which output signals are induced by magnetic flux changes in said further member, a first control conductor which passes through the aperture of said first and second members and which is coupled to said conductor path in one sense through said first member and equally in the opposite sense through said second member whereby electric control signals supplied to this control conductor produce mutually cancelling signals in said conductor path, and a second control conductor which passes through the aperture of said second member, an output signal being obtained in said output conductor as the result of the supply of electric control signals to both control conductors.

2. A magnetic data store device according to claim 1 wherein there is provided a third member which is fabricated of ferromagnetic material having an approximately rectangular hysteresis characteristic and hence a large retentivity and which has an aperture, wherein said conductor path also passes through the aperture of this third member whereby electric signals are induced in this path by magnetic flux changes in the third member and wherein said second control conductor passes through the aperture of said third member and is coupled to said conductor path in one sense through said second member and equally in the opposite sense through said third member whereby electric control signals supplied to this second control conductors produce mutually cancelling signals in said conductor path, an output signal being obtained in said output conductor only as the result of the supply of electric control signals to both control conductors that effect a change in the polarity of remanent magnetization in at least said second member.

3. A magnetic data store device according to claim 2 in combination with pulse supply means which is connected to said control conductors and which is for supplying electric current pulses to said control conductors each of which pulses has the sense necessary to change the polarity of remanent magnetization in said second member but only slightly more than half the magnitude required to produce that change whereby only coincident current pulses supplied said pulse supply means to said control conductors change the polarity of remanent magnetization in said second member and produce an output signal in said output path.

4. A magnetic data store device according to claim 2 in combination with pulse supply means which is connected to said control conductors and which is for supplying electric current pulses to those control conductors each of which pulses has the sense and at least the magnitude required to change the polarity of remanent magnetization in any of said first, second and third members whereby such a pulse supplied to one of said control conductors effects such a change in said second member and one of said first and third members and such a pulse then supplied to the other one of said control members effects such a change only in the other one of said first and third members, the change in said second member having been affected by the first mentioned pulse.

5. A magnetic data store according to claim 2 wherein each of said first, second and third members is of small size relative to said further member and has an aperture that is small relative to the aperture of said further member.

6. A magnetic data store device according to claim 5 wherein said output conductor comprises one of a plurality of output conductors which pass through the aperture of said further member.

7. A magnetic data store device according to claim 2 wherein said first, second and third members are of the same size and are fabricated of the same material and wherein said conductor path passes an equal number of times through the aperture of each of said first, second and third members.

8. A magnetic data store device according to claim 7 wherein said conductor path passes only once through the aperture of each of said first, second and third members and passes twice through the aperture of said further member.

9. A magnetic data store device according to claim 2 wherein a board of electrical insulating material carries said first, second and third members and said further member.

10. A magnetic data store device according to claim 9 wherein there is provided electrically conducting mounting means by which said further member is attached to said board and which comprises part of said conductor path.

11. A magnetic data store device according to claim 9 wherein there are provided two spaced metal staples arranged such that each passes through the aperture of said further member and each of which has two limbs that extend through and are a tight fit in apertures through said board, said further member being attached to said board by these two staples which both are included in said conductor path.

12. A magnetic data store device according to claim 11 wherein two lengths of wire are connected between the free ends of the limbs of said staples to connect those staples electrically in series in said conductor path, one length of wire passing through the apertures of said first and third members and the other length of wire passing through the aperture of said second member.

13. A magnetic data store device according to claim 9 wherein said first, second and third members and said control conductors are on one side of said board and said further member and said output conductor are on the opposite side of said board.

14. A magnetic data storage arrangement that employs a plurality of magnetic data store devices each according to claim 2.

15. A magnetic data storage arrangement according to claim 14 wherein a board of electrical insulating material carries said first, second, third and further members of every data store device.

16. A magnetic data storage arrangement according to claim 14 wherein the data store devices are arranged in a matrix comprising M columns and N rows of those devices, where M and N are integers, wherein M control paths are associated with the M columns respectively and each provides one control conductor of each device in the associated column, and wherein further M control paths are associated with the N rows respectively and each provides the other control conductor of each device in the associated row.

17. A magnetic data storage arrangement according to claim 14 wherein a plurality of output conductors pass through the aperture of said further member of each data store device and wherein a plurality of output paths which include all the output conductors of said data store devices, are selectively coupled to these devices to determine the pieces of information stored by the storage arrangements.

References Cited

UNITED STATES PATENTS

| | | | |
|---|---|---|---|
| 3,075,185 | 1/1963 | Schoenmakers | 340—174 |
| 3,217,103 | 11/1965 | Lien | 179—1 |
| 3,308,447 | 3/1967 | Valassis | 340—174 |
| 3,327,296 | 6/1967 | Radcliffe | 340—174 |

OTHER REFERENCES

IBM Technical Disclosure Bulletin: "Two Core Per Bit Memory," by Brosseau; vol. 9, #7, Dec. 1966, pages 886, 887; copy in 340—174.

STANLEY M. URYNOWICZ, Jr., *Primary Examiner.*